US011662305B2

(12) United States Patent
Ikeda et al.

(10) Patent No.: US 11,662,305 B2
(45) Date of Patent: *May 30, 2023

(54) GAS DETECTION APPARATUS

(71) Applicant: Asahi Kasei Microdevices Corporation, Tokyo (JP)

(72) Inventors: Yuji Ikeda, Kyoto (JP); Keiichiro Kuwata, Tokyo (JP); Takaaki Furuya, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 17/208,004

(22) Filed: Mar. 22, 2021

(65) Prior Publication Data

US 2021/0302309 A1    Sep. 30, 2021

(30) Foreign Application Priority Data

Mar. 31, 2020 (JP) .............................. JP2020-064487
Mar. 8, 2021 (JP) .............................. JP2021-036353

(51) Int. Cl.
*G01N 21/3504* (2014.01)
*F21V 8/00* (2006.01)

(52) U.S. Cl.
CPC ....... *G01N 21/3504* (2013.01); *G02B 6/0011* (2013.01); *G01N 2201/0636* (2013.01)

(58) Field of Classification Search
CPC ....... G01N 21/3504; G01N 2021/3545; G01N 2201/0636; G01N 2201/08; G02B 6/0011
See application file for complete search history.

(56) References Cited

U.S. PATENT DOCUMENTS

2013/0026369 A1 * 1/2013 Gibson .............. G01N 21/3504
156/60
2019/0145828 A1   5/2019 Lin et al.

FOREIGN PATENT DOCUMENTS

JP    2013517467 A    5/2013
JP    2015184211 A    10/2015
JP    2017015567 A    1/2017

* cited by examiner

*Primary Examiner* — Jamil Ahmed
(74) *Attorney, Agent, or Firm* — Kenja IP Law PC

(57) ABSTRACT

A gas detection apparatus 1 includes a substrate 2; a light emitting element 3 provided on a main surface of the substrate for emitting light; a light receiving element 4 provided on the main surface of the substrate 2 for receiving the light; a light guide member 5 for guiding the light emitted by the light emitting element 3 to the light receiving element; a first joint member 6; and a second joint member 7. The first joint member joins the substrate and the light guide member, limits a displacement in a direction parallel and/or orthogonal to the main surface of the substrate. The second joint member joins the substrate and the light guide member, limits a displacement of the light guide member in a direction parallel to the main surface of the substrate and/or limits a displacement within a plane orthogonal to the main surface of the substrate.

20 Claims, 15 Drawing Sheets

FIG. 3
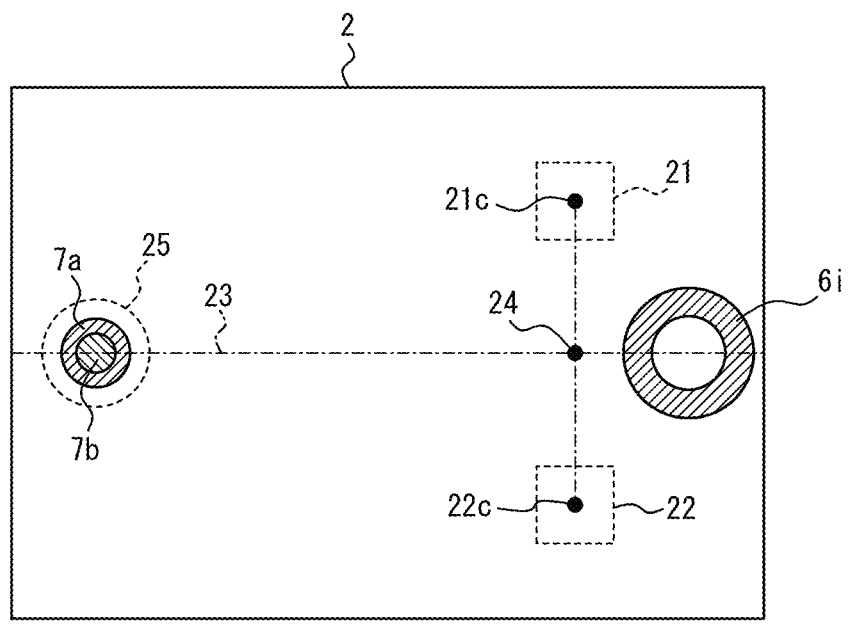
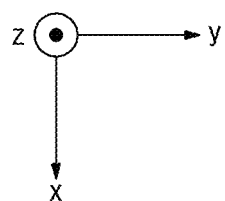

FIG. 7
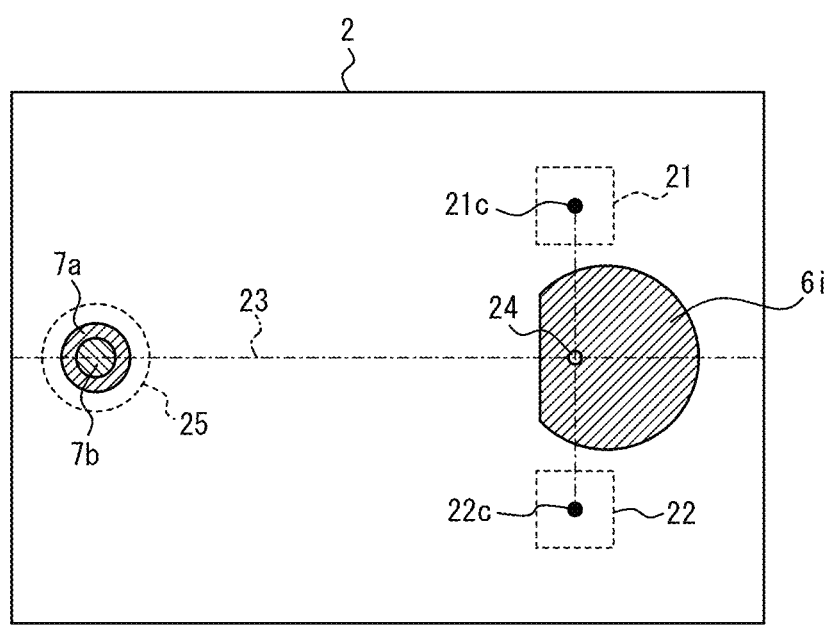
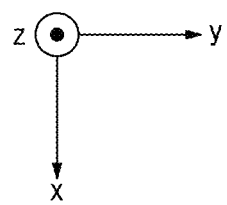

FIG. 8
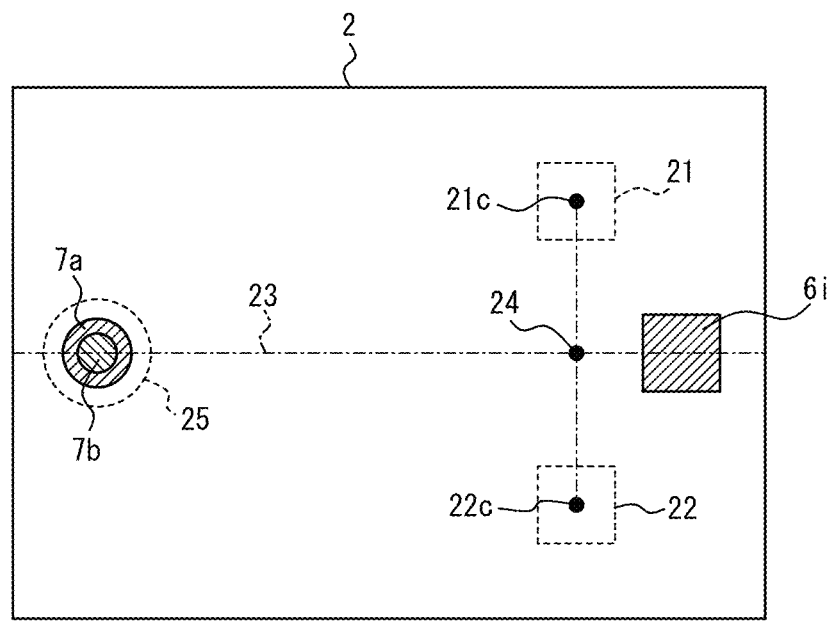
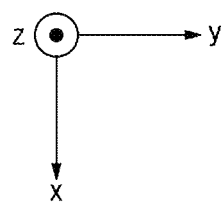

FIG. 11
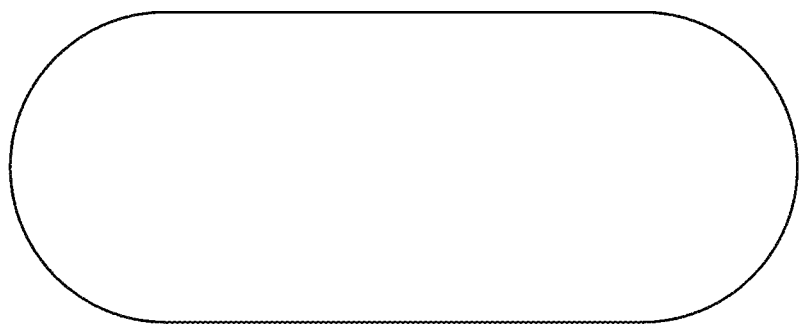
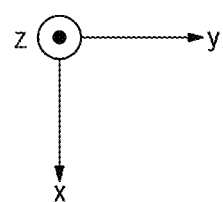

FIG. 12
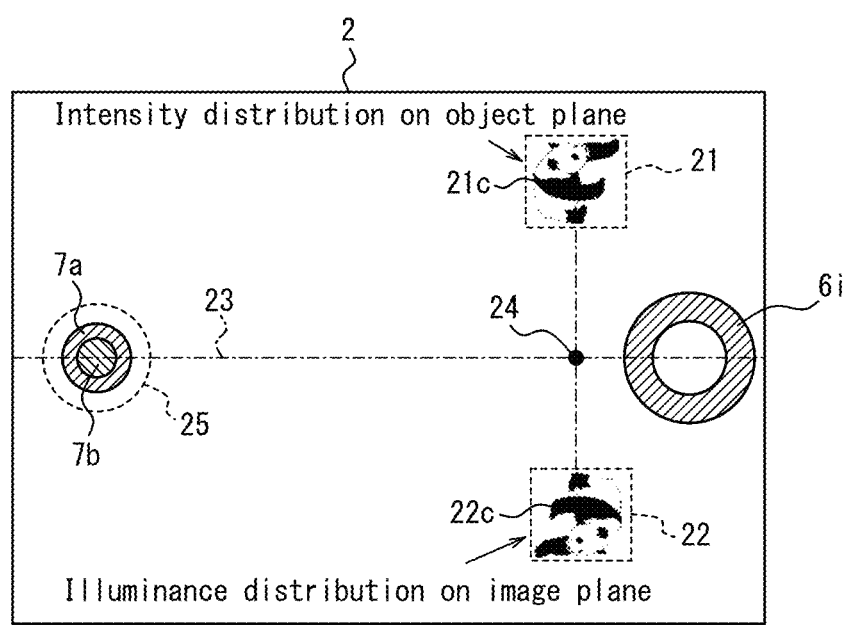
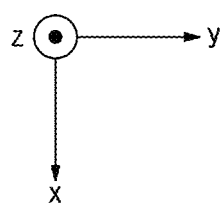

FIG. 13
Without thermal expansion
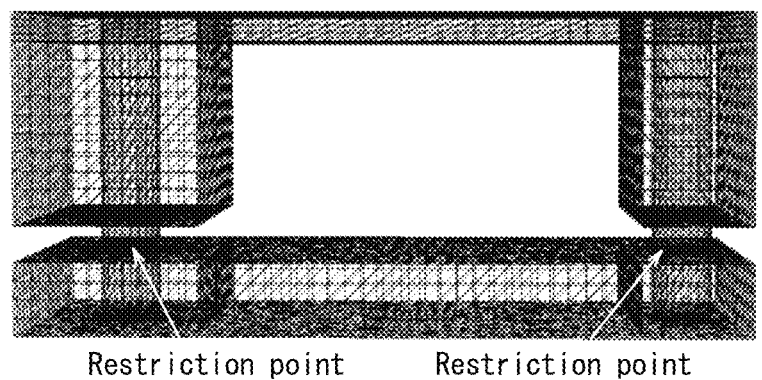
Restriction point    Restriction point
With thermal expansions
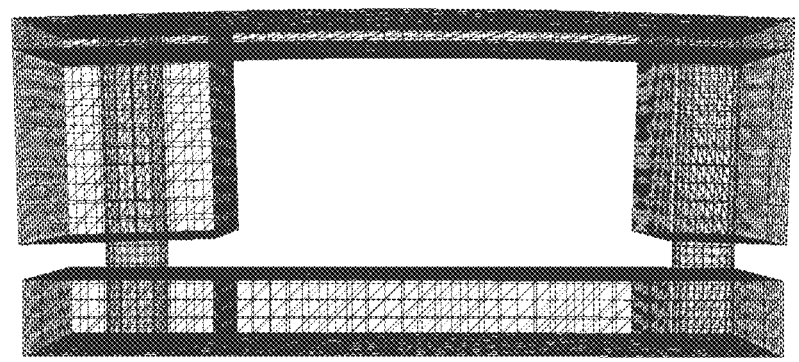
(Over constraint causes distortions)

FIG. 14
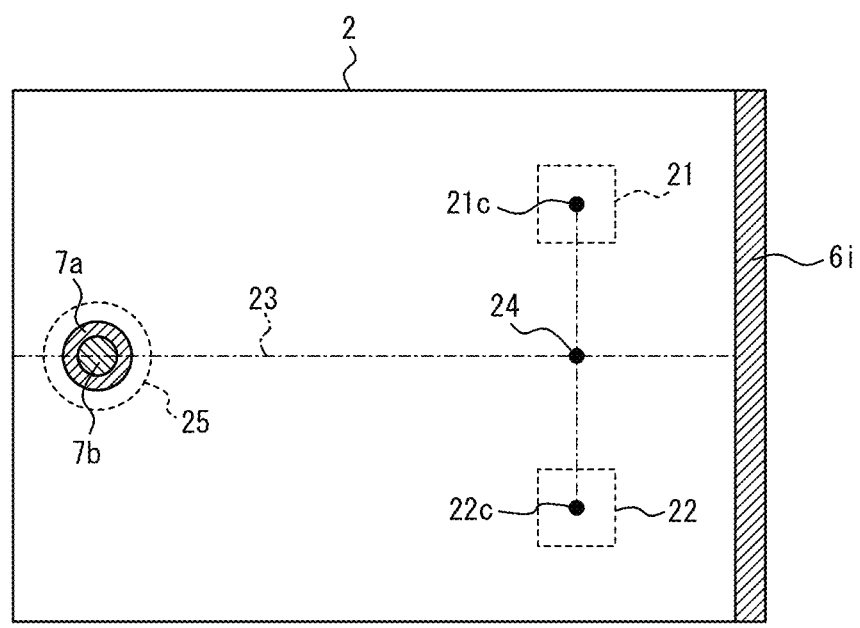
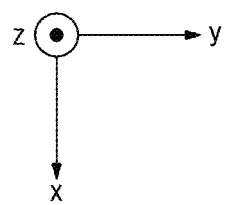

FIG. 15
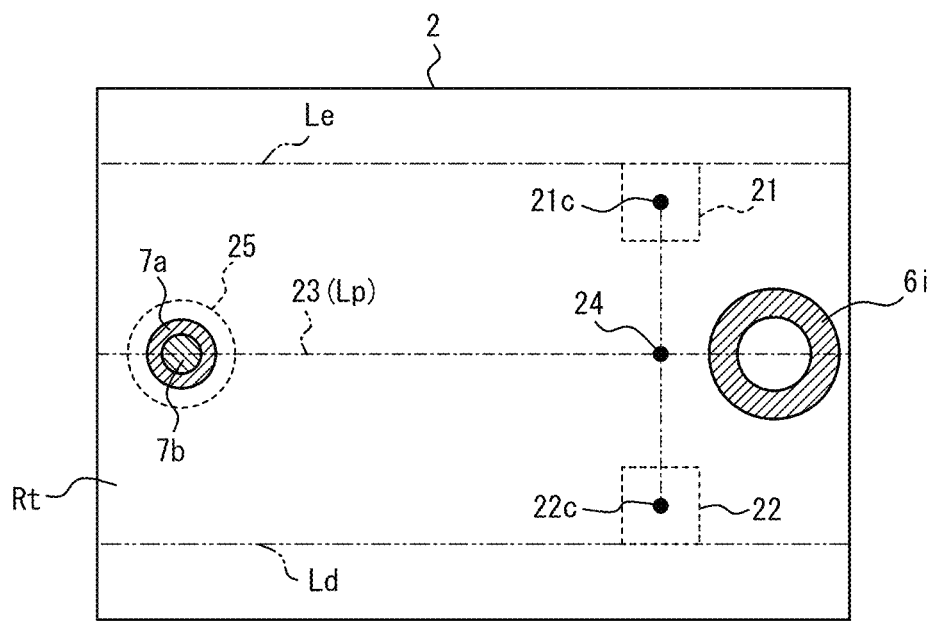
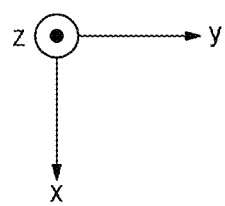

GAS DETECTION APPARATUS

CROSS-REFERENCE TO RELATED APPLICATION

The present application claims priority to and the benefit of Japanese Patent Application No. 2020-064487 filed Mar. 31, 2020 and Japanese Patent Application No. 2021-36353 filed Mar. 8, 2021, the entire contents of which are incorporated herein by reference.

TECHNICAL FIELD

The present disclosure relates to a gas detection apparatus.

BACKGROUND

Gas detection apparatuses for detecting gases have been used in various fields. For example, PTL 1 discloses an apparatus including a light source for emitting infrared light and a detector for detecting infrared light in a certain wavelength, accommodated in the same case. A gas to be detected is introduced to the case.

CITATION LIST

Patent Literature

PTL 1: JP 2015-184211 A

SUMMARY

Here, in the gas detection apparatus disclosed in PTL 1, the optical path pipe is securely joined to the substrate and the case by grooves in the substrate fixing portion and fixing members. Accordingly, in case of a thermal expansion, the thermal expansion may cause distortions of the substrate and the case, for example, the distortions may be transmitted to the optical path pipe, which may distort the optical path or alter the relative positions of optical surfaces. As a result, the gas detection sensitivity may fluctuate.

In light of the aforementioned issue, it would be thus helpful to provide gas detection apparatuses which are capable of suppressing occurrences of distortions of the optical path.

A gas detection apparatus according to an embodiment of the present disclosure comprises:
 a substrate;
 a light emitting element provided on a main surface of the substrate for emitting light;
 a light receiving element provided on the main surface of the substrate for receiving the light;
 a light guide member for guiding the light emitted by the light emitting element to the light receiving element;
 a first joint member; and
 a second joint member,
 the first joint member joining the substrate and the light guide member, and limiting a displacement to a direction parallel and/or orthogonal to the main surface of the substrate when an external force is applied to the light guide member,
 the second joint member joining the substrate and the light guide member, and limiting a displacement of the light guide member to a direction parallel to the main surface of the substrate and/or limiting the displacement within a plane orthogonal to the main surface of the substrate, when an external force is applied to the light guide member or when a thermal expansion causes a distortion, and
 at least one of the first joint member and the second joint member being allowed to be displaced in the direction parallel to the main surface of the substrate or within the plane orthogonal to the main surface of the substrate.

A gas detection apparatus according to an embodiment of the present disclosure comprises:
 a substrate comprising a light emitting element for emitting light and a light receiving element for receiving the light, the light emitting element and the light receiving element being provided on a main surface of the substrate;
 a light guide member for guiding the light emitted by the light emitting element to the light receiving element;
 a first joint member joining the substrate and the light guide member; and
 a second joint member joining the substrate and the light guide member, the second joint member having a smaller joint degree than that of the first joint member.

A gas detection apparatus according to an embodiment of the present disclosure comprises:
 a substrate;
 a light emitting element provided on a main surface of the substrate for emitting light;
 a light receiving element provided on the main surface of the substrate for receiving the light;
 a light guide member for guiding the light emitted by the light emitting element to the light receiving element;
 a first joint member; and
 a second joint member,
 the first joint member restricting the substrate and the light guide member in a first translation direction parallel to a plane of the substrate in a first restriction degree, in a second translation direction parallel to the plane of the substrate and orthogonal to the first translation direction in a second restriction degree, and in a third translation direction orthogonal to the plane of the substrate in a third restriction degree,
 the second joint member restricting the substrate and the light guide member in the first translation direction in a fourth restriction degree, in the second translation direction in a fifth restriction degree, and in the third translation direction in a sixth restriction degree, and
 at least one of the first to sixth restriction degrees being zero, at least one of the first restriction degree and the fourth restriction degree being non-zero, at least one of the second restriction degree and the fifth restriction degree being non-zero, and at least one of the third restriction degree and the sixth restriction degree being non-zero.

According to embodiments of the present disclosure, gas detection apparatuses are provided which are capable of suppressing occurrences of distortions of the optical path.

BRIEF DESCRIPTION OF THE DRAWINGS

In the accompanying drawings:

FIG. 3 is a diagram illustrating an example of the dispositions and the shapes of first and second joint members;

FIG. 7 is a diagram illustrating another example of the disposition and the shape of the first joint member;

FIG. 8 is a diagram illustrating another example of the shape of the first joint member;

FIG. 11 is a diagram for explaining an elongated hole;

FIG. 12 is a diagram for explaining the intensity distribution on the object plane (light emitting surface) and the illuminance distribution on the image plane (light receiving surface);

FIG. 13 is a diagram for explaining the relationship between restriction points and distortions;

FIG. 14 is a diagram illustrating another example of the shape of the first joint member; and FIG. 15 is a diagram illustrating an example of the dispositions of the first and second joint members.

DETAILED DESCRIPTION

First Embodiment

Figure 1:
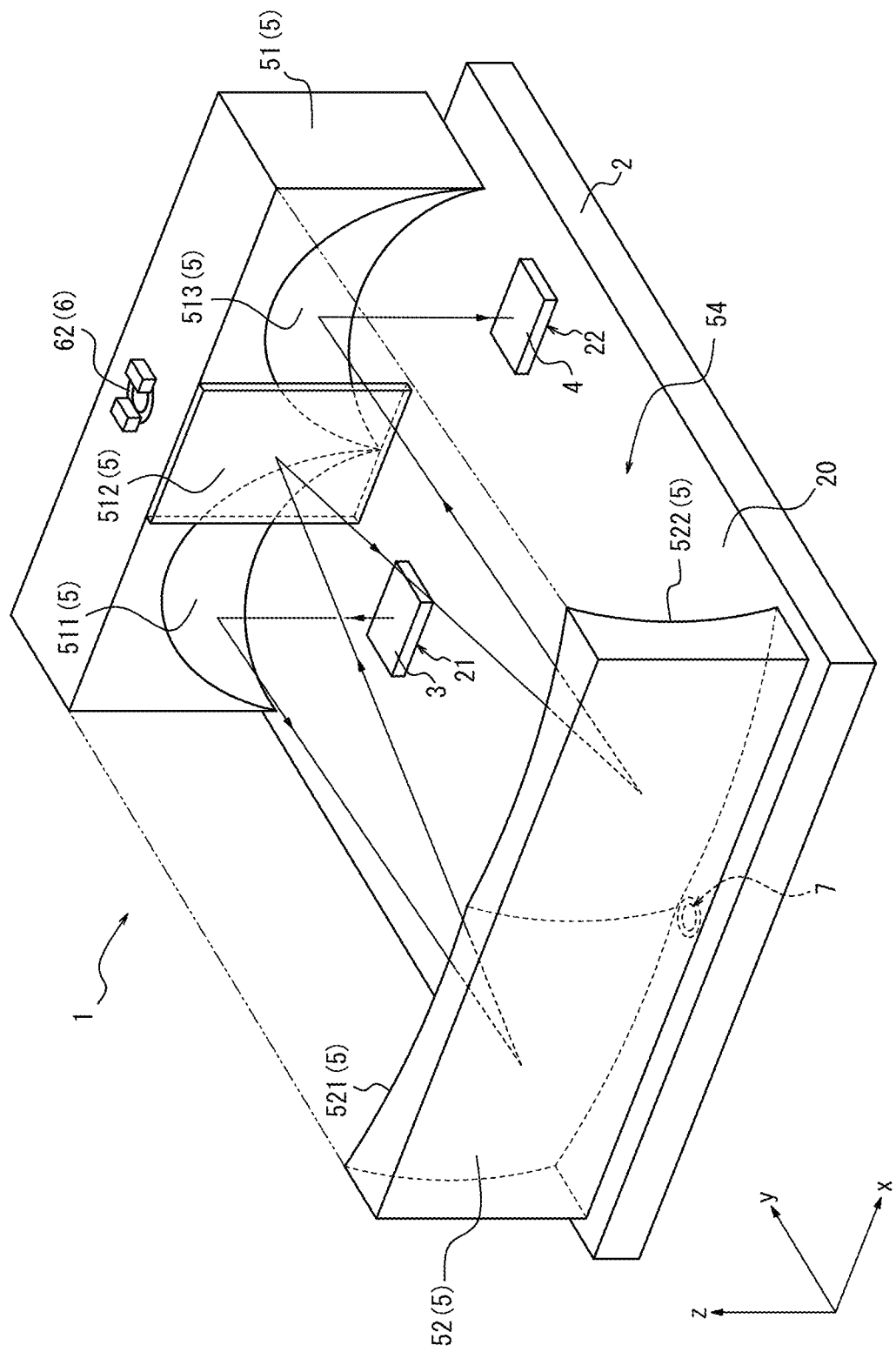
FIG. 1 is a perspective view illustrating a gas detection apparatus according to an embodiment of the present disclosure, a part of which is made transparent.

FIG. 1 is a perspective view illustrating a gas detection apparatus 1 according to an embodiment of the present disclosure, a part of which is made transparent. In one example, the gas detection apparatus 1 is a small-sized apparatus with dimensions of 30 mm×20 mm×10 mm, and is also referred to as a "gas sensor". In the present embodiment, the gas detection apparatus 1 is an apparatus employing the non-dispersive infrared (NDIR) spectroscopy for measuring the density of a gas to be detected based on infrared light which has transmitted through the introduced gas. Examples of the gas to be detected include carbon dioxide, water vapor, methane, propane, formaldehyde, carbon monoxide, nitric oxide, ammonium, sulfur dioxide, and alcohol.

The gas detection apparatus 1 includes a substrate 2, a light emitting element 3, a light receiving element 4, a light guide member 5, a first joint member 6, and a second joint member 7. FIG. 1 illustrates an example configuration of the gas detection apparatus 1 in which a part of the light guide member 5 is made transparent so that the light emitting element 3 and the light receiving element 4 provided on the main surface 20 of the substrate 2 are visible. In the present embodiment, the main surface 20 is the surface facing the light guide member 5 among the largest surfaces of the substrate 2.

Hereinafter, as illustrated in FIG. 1, the rectangular coordinate system is defined so that xy-planes are parallel to the main surface 20 of the substrate 2. The z-axis direction is the direction orthogonal to the main surface 20 of the substrate 2. The x- and y-axis directions are parallel to the sides of the main surface 20 of the substrate 2. Here, the y-axis direction corresponds to the direction along which a first reflecting portion 51 and a second reflecting portion 52 to be described later face to each other.

The substrate 2 is a plate-shaped member on which components of the gas detection apparatus 1 are amounted, providing electrical connections between the mounted electronic components. The light emitting element 3 and the light receiving element 4 are provided on the main surface 20 of the substrate 2. Other electronic components may also be mounted on the substrate 2. For example, a controller for controlling at least one of the light emitting element 3 and the light receiving element 4 may be provided on the main surface 20 or the bottom surface opposite to the main surface 20 of the substrate 2. Additionally, a computation unit for carrying out computations for calculating the gas density may also be provided on the main surface 20 or the bottom surface of the substrate 2. The computation unit may include at least one of a general-purpose processor that performs functions according to a program that is read, and a dedicated processor specialized for particular processing. The dedicated processor may include an application specific integrated circuit (ASIC). The processor may include a programmable logic device (PLD). The computation unit may be integrated with the controller described above.

The light emitting element 3 is a component for emitting light used for detection of the gas to be detected. The light emitting element 3 is not particularly limited as long as it outputs light including light components in wavelengths absorbable by the gas to be detected. In the present embodiment, the light emitted by the light emitting element 3 is, but not limited to, infrared light. The light emitting element 3 is a light emitting diode (LED) in the present embodiment. In another example, the light emitting element 3 may be a semiconductor laser, an organic light emitting element, a micro electro mechanical systems (MEMS) heater, or the like. The light emitting element 3 is provided in a first region 21 in the main surface 20 of the substrate 2. The z-axis directional position of the first region 21 is set so that the first region 21 faces a first mirror 511 to be described later.

The light receiving element 4 is a component for receiving light which has transmitted through the introduced gas. The light receiving element 4 is not particularly limited as long as it has sensitivity to light in bandwidths including wavelengths absorbable by the gas to be detected. In the present embodiment, the light receiving element 4 receives, but is not limited to, infrared light. The light receiving element 4 is a photodiode in the present embodiment. In another example, the light receiving element 4 may be a phototransistor or a thermopile, a pyroelectric sensor, a bolometer, or the like. The light receiving element 4 converts the received light into an electrical signal, and outputs the converted electrical signal. The electric signal is output to, for example, the computation unit. The computation unit receives the electrical signal, and calculates the density of the gas to be detected based on a property such as the transmittance of the light. The light receiving element 4 is provided in a second region 22 in the main surface 20 of the substrate 2. The z-axis directional position of the second region 22 is set so that the second region 22 faces a fifth mirror 513 to be described later. The light receiving element 4 may include an optical filter having a wavelength selection function.

The light guide member 5 is a member for guiding the light emitted by the light emitting element 3 to the light receiving element 4. The light guide member 5 is an optical system of the gas detection apparatus 1. The light guide member 5 includes optical members to configure an optical path from the light emitting element 3 to the light receiving element 4. In other words, the light guide member 5 optically couples the light emitting element 3 and the light receiving element 4. Here, the optical members are a mirror and a lens, for example.

In the present embodiment, the light guide member 5 includes a first reflecting portion 51 and a second reflecting portion 52. The first reflecting portion 51 includes a first mirror 511, a third mirror 512, and a fifth mirror 513 as optical members. The first reflecting portion 51 includes a mirror that reflects light emitted by the light emitting element 3 for the first time and a mirror that reflects the light immediately before the light is received by the light receiving element 4. The second reflecting portion 52 includes a second mirror 521 and a fourth mirror 522 as optical members. The light guide member 5 reflects light emitted by the light emitting element 3 with the first mirror 511, the second mirror 521, the third mirror 512, the fourth mirror 522, and the fifth mirror 513, in this order, to guide the light to the light receiving element 4. A cell 54 is provided between the light guide member 5 and the substrate 2, and the optical path is configured to pass through the cell 54 to which the gas is introduced. In another example, the number of the mirrors provided in the light guide member 5 may not be five but may be any number equal to or greater than one. Further, the light guide member 5 may be configured to include a lens in a part of the optical path.

In the light guide member 5, the relative position of the first reflecting portion 51 to the second reflecting portion 52 is fixed. For example, the first reflecting portion 51 and the second reflecting portion 52 may be molded monolithically from a resin. The mirrors of the first reflecting portion 51 and the second reflecting portion 52 may be formed by metal plating subsequent to the monolithic molding. In another example, the first reflecting portion 51 and the second reflective portion 52 may be formed as separate entities and securely fixed to each other by an adhesive, screws, nails, mating, grommets, welding, or the like.

The first mirror 511 is a converging mirror that reflects light emitted from the light emitting element 3 located at the focal point. The first mirror 511 is, for example, a concave mirror. The first mirror 511 may be shaped to have an elliptic surface. In this embodiment, the first mirror 511 reflects light emitted in the z-axis direction from the light emitting element 3 located at the focal point, toward the xy-plane direction. As used herein, the term "xy-plane direction" refers to a direction having at least one of x- and y-axis directional components. Note that the xy-plane direction may include a z-axis directional component.

The second mirror 521, the third mirror 512, and the fourth mirror 522 reflect respective light that is incident thereon. At least one of the second mirror 521, the third mirror 512, and the fourth mirror 522 may be a converging mirror having a light converging function. At least one of the second mirror 521, the third mirror 512, and the fourth mirror 522 may be, for example, a concave mirror. As illustrated in FIG. 1, the second mirror 521 reflects light that is incident from the first mirror 511, to the third mirror 512. The third mirror 512 reflects light that is incident from the second mirror 521, to the fourth mirror 522. The fourth mirror 522 reflects light that is incident from the third mirror 512, to the fifth mirror 513.

The fifth mirror 513 is a converging mirror for converging incident light on the light receiving element 4. The fifth mirror 513 is, for example, a concave mirror. The fifth mirror 513 may be shaped to have an elliptic surface. In this embodiment, the fifth mirror 513 reflects incident light in the xy-plane direction from the fourth mirror 522 so that the reflected light has a component in the z-axis direction. Specifically, the fifth mirror 513 reflects incident light so that the light is condensed on the light receiving element 4 located at the focal point position.

Examples of the material composing the first mirror 511, the second mirror 521, the third mirror 512, the fourth mirror 522, and the fifth mirror 513 may include, but are not limited to, metals, glass, ceramics, and stainless steels, for example. From the viewpoint of improving the detection sensitivity, these mirrors are preferably made of a material having a low light absorption coefficient and a high reflectance. Specifically, resin housings provided with coating of an alloy containing aluminum, gold, or silver, a dielectric, or a laminate of these materials are preferred. Resin housings coated with gold or an alloy layer containing gold are preferred in view of the reliability and degradation over time. Further, a laminated film of a dielectric is preferably formed on the surface of the metal layer for increasing the reflectance and preventing degradation over time. Formation of the first mirror 511 and the fifth mirror 513 by vapor deposition or plating to the resin casing can achieve a higher productivity and provide improved lightweightness as compared with cases where they are made from a metal material. Further, the difference of the thermal expansion coefficients with the substrate 2 is reduced, which suppresses thermal deformations to thereby suppress fluctuations of the sensitivity. Alternatively, the light guide member 5 may be formed by machining, and is more preferably formed by injection molding in view of the productivity.

The first joint member 6 is a member joining the substrate 2 and the light guide member 5. In the present embodiment, the first joint member 6 is one columnar body, and includes a first bottom portion 61 joining to the substrate 2 and a second bottom portion 62 joining to the light guide member 5 (see FIG. 2). The first bottom portion 61 and the substrate 2 are joined by, for example, an adhesive, a grommet or screw, welding, a nail, mating, or the like. The second bottom portion 62 and the light guide member 5 are joined in the similar manner. In addition, in view of the productivity, the first joint member 6 and the light guide member 5 are preferably molded monolithically in view of reduction of the number of components.

The second joint member 7 is a member joining the substrate 2 and the light guide member 5 at a position different from the position of the first joint member 6. An inserted portion 7a of the second joint member 7 (see FIG. 2) is connected to the light guide member 5. The inserted portion 7a of the second joint member 7 may be securely connected to the light guide member 5 by an adhesive, a grommet or screw, welding, a nail, mating, or the like. In another example, the inserted portion 7a of the second joint member 7 is made from the same material as the light guide member 5 and may be molded monolithically with the light guide member 5. In the case where the inserted portion 7a of the second joint member 7 is molded monolithically with the light guide member 5, the number of the components is reduced, which contributes to an improvement in the productivity. As illustrated in FIG. 1, the first reflecting portion 51 is joined to the substrate 2 by the first joint member 6, and the second reflecting portion 52 is joined to the substrate 2 by the second joint member 7.

Figure 2:
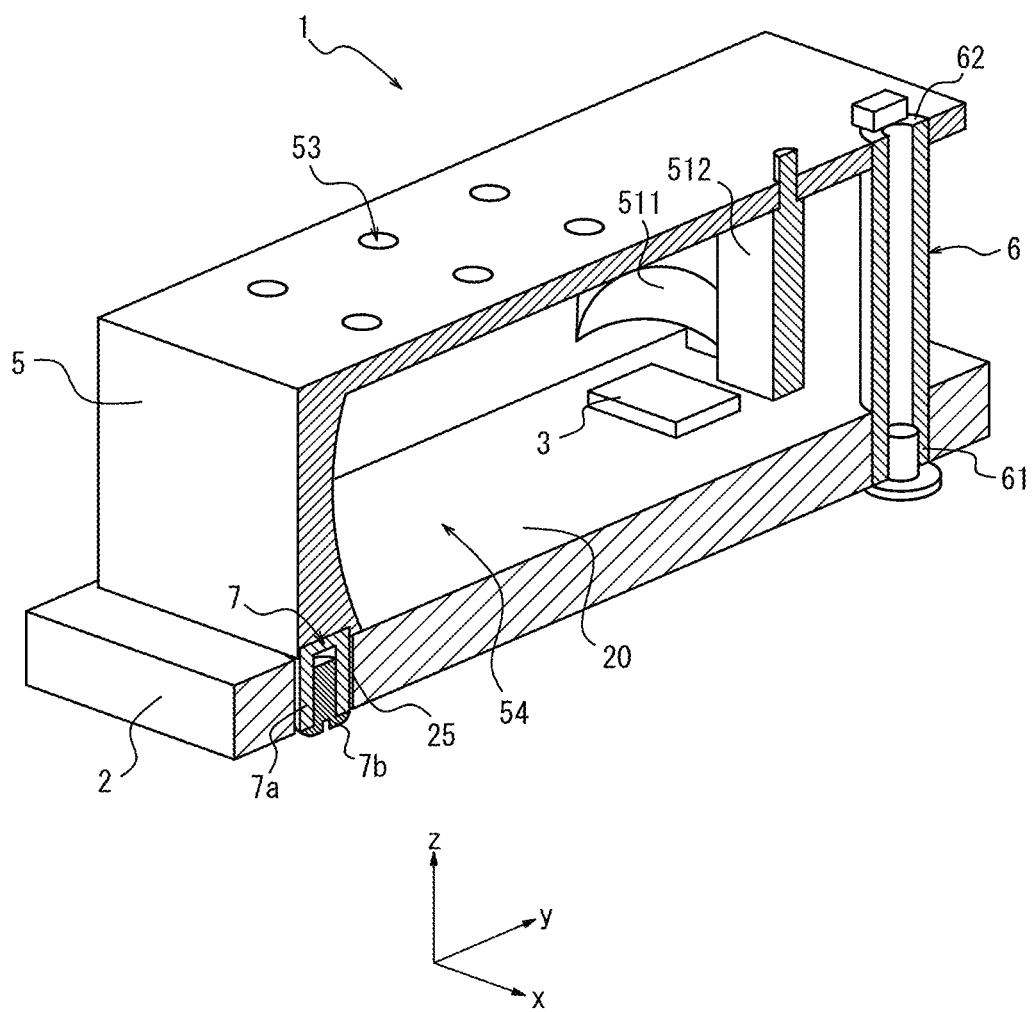
FIG. 2 is a diagram illustrating an example of a cross-section of the gas detection apparatus.

FIG. 2 is a diagram illustrating an example cross-section of the gas detection apparatus 1. FIG. 2 depicts a cross-section where the substrate 2, the light guide member 5 including the third mirror 512, the first joint member 6, and the second joint member 7 are cut along a plane parallel to yz-planes. The cell 54 is defined by the interior of the gas detection apparatus 1 sandwiched between the substrate 2 and the light guide member 5. The light guide member 5 includes vents 53 for introducing a gas into the cell 54. The vents 53 may also be used for discharging the gas from the cell 54. In the present embodiment, the first joint member 6 is a hollow columnar body. The first bottom portion 61 is joined to the substrate 2 by inserting a screw from the bottom surface of the substrate 2 into the hollow portion. The second bottom portion 62 is joined to the light guide member 5 by a grommet that extends in the hollow portion after being inserted into the hollow portion. In another example, the first joint member 6 may be a solid columnar body. The first bottom portion 61 and the substrate 2, and the second bottom portion 62 and the light guide member 5 may be joined to each other by an adhesive, welding, nails, mating, or the like.

The second joint member 7 includes the inserted portion 7a and a fastening member 7b. As described above, a part of the inserted portion 7a is securely connected to the light guide member 5. At least a part of the inserted portion 7a is inserted into a hole 25 in the substrate 2. In another example, at least a part of the fastening member 7b may be inserted into the hole 25. The hole 25 is a hole provided in the substrate 2. In the present embodiment, the hole 25 penetrates the substrate 2 in the z-axis direction, i.e., the thickness direction. In this embodiment, the inserted portion 7a is a columnar body. The inserted portion 7a includes a hole in the surface opposite to the surface connected to the light guide member 5, and the fastening member 7b is inserted into the hole. The fastening member 7b is inserted into the hole 25 from the bottom surface of the substrate 2 to fasten the inserted portion 7a. Although the fastening member 7b is a screw in this embodiment, the fastening member 7b may be a pin, a grommet, or the like in other specific examples. The fastening member 7b and the hole in the inserted portion 7a are provided with threads which mate with each other. In other words, the fastening member 7b fastens the inserted portion 7a by being screwed in the inserted portion 7a. In another example, the second joint member 7 may be configured not to have the fastening member 7b. Specifically, the second joint member 7 may be configured only from the inserted portion 7a without a hole for the fastening member 7b. In this case, the hole 25 is may be a hole that is provided in the main surface 20 but does not penetrate the substrate 2 in the z-axis direction. The first mirror 511, the main surface 20 of the substrate 2, and the light emitting element 3 in FIG. 2 are the same as the corresponding elements denoted by the same reference symbols in FIG. 1, and a description thereof will thus be omitted. The hole 25 may be an elongated hole extending in one direction for the reason which will be described later. Preferably, the hole 25 may be a hole extending in a direction connecting the centers of the respective orthogonal projection images of the first joint member and the second joint member to the main surface of the substrate 2. As used herein, the term "direction" in "extending in a direction" is the direction along which the major axis of the elongated hole extends. In the configuration where the hole 25 is an elongated hole and the second joint member 7 is fastened by the fastening member 7b, the second joint member limits a displacement of the light guide member in directions other than one certain direction which is parallel to the main surface 20 of the substrate 2, and is the extension direction of the hole, when an external force is applied to the light guide member 5 or when a thermal expansion causes a distortion. An example of the external force is torsion in the z-axis direction which is applied when a representative point on the light guide member 5 is pressed while the substrate 2 of the gas detection apparatus 1 is fixed to a base. Specifically, one point on the light guide member 5 other than the first joint member or a point on the surface of the light guide member 5 farthest from the first joint member is selected as the representative point, and an external force is applied to that representative point, for example. Another example of the representative point is the geometric center of each surface of the light guide member 5. The direction of the external force is the direction parallel to the main surface 20 of the substrate 2 and orthogonal to the direction connecting the representative point and the first joint member. In the configuration where the second joint member 7 does not include fastening member 7b, the second joint member 7 can be displaced freely in the direction orthogonal to the main surface 20 of the substrate 2. Thus, when an external force is applied to the light guide member 5 or when a thermal expansion causes a distortion, a displacement of the second joint member 7 is limited within a plane orthogonal to the main surface 20 of the substrate 2. As used herein, the term "elongated hole" refers to a hole shaped so that the outer periphery of the hole contains two parallel line segments, as illustrated in FIG. 11. As a specific example, the elongated hole may be a hole defined by continuously arranging circles of the same diameter so that the centers of the circles are aligned to form a line segment, or may be a rectangular hole. However, configurations where the first joint member and the second joint member limit displacements to the directions parallel to and orthogonal to the main surface of the substrate may be excluded from the embodiment of the present disclosure.

FIG. 3 is a diagram illustrating an example of the disposition and the shape of the first joint member 6. In FIG. 3, the main surface 20 of the substrate 2 viewed toward the z-axis negative direction is illustrated. An orthogonal projection image 6i is an image of the first joint member 6, where the first joint member 6 is projected orthogonally to the main surface 20 of the substrate 2. In the present embodiment, the orthogonal projection image 6i to the main surface 20 of the substrate 2 is hollow circular. In another example where the first joint member 6 is a solid columnar body, the orthogonal projection image 6i is solid circular. In FIG. 3, the midpoint 24 of the line segment connecting the center 21c of the first region 2 and the center 22c of the second region 22 is illustrated. In addition, the perpendicular bisector 23 of the line segment connecting the center 21c of the first region 21 and the center 22c of the second region 22 is also illustrated in FIG. 3. This figure also illustrates that the second joint member 7 having the inserted portion 7a and the fastening member 7b is inserted into the hole 25 so as to be spaced apart from the hole 25. In the present embodiment, the first joint member 6 is disposed so that the orthogonal projection image 6i thereof to the main surface 20 of the substrate 2 is on the perpendicular bisector 23. Further, although details will be described later, the substrate 2 and the light guide member 5 are joined substantially by the first joint member 6 so that the second joint member 7 joins the light guide member 5 so as to allow free displacements in a certain direction, in other words, the second joint member 7 joins the light guide member 5 with a certain degree of freedom. Here, the orthogonal projection image 6i may be a cross-sectional shape of the portion of the first joint member 6 directly on the main surface 20 of the substrate 2.

The first joint member 6 and the second joint member 7 can be made of a material which has a high elastic modulus and is resistant to deformations. For example, examples of the materials of the first joint member 6 and the second joint member 7 include hard resins containing a liquid crystal polymer (LCP), polypropylene (PP), polyether ether ketone (PEEK), polyamide (PA), polyphenylene ether (PPE), polycarbonate (PC), polyphenylene sulfide (PPS), and a polymethyl methacrylate resin (PMMA), and a mixture of two or more of these; and metals in view of the heat resistance. The first joint member 6, the second joint member 7, and the light guide member 5 may be made of the same material. When the first joint member 6, the second joint member 7, and the light guide member 5 are made of the same material, no thermal expansion difference is generated to thereby suppress thermal distortions. The substrate 2 and the light guide member 5 are joined substantially by the first joint member 6. Accordingly, even when the substrate 2 deforms due to a thermal expansion, for example, this configuration prevents the light guide member 5 from being affected by the deformation of the substrate 2 because only one restriction point is present without over constraints. The light guide member 5 is connected to the substrate 2 substantially only at the single point. Thus, when the substrate 2 deforms so as to expand in the y-axis direction, for example, the optical members are similarly reduced (or magnified) around this single point without being distorted. In this case, the optical performances are not affected.

Suppose that the second joint member 7 is not present and respective different forces act on the substrate 2 and the light guide member 5, the first joint member 6 would be resistant to deformations in axial directions. Torsional and bending deformations, however, might arise. Accordingly, when the second joint member 7 does not restrict the light guide member 5 in the x direction, for example, the light guide member 5 may be rotationally displaced relative to the substrate 2 about the first joint member 6 as the rotation axis. In other words, the first joint member 6 serves as a rotation axis when an external force is applied to the light guide member 5 in the direction parallel to the main surface 20 of the substrate 2. Stated differently, the first joint member 6 may serve as the rotation axis about which the light guide member 5 is displaced relative to the substrate 2. As used herein, the term "displacement", "displace", or "displaced" may mean that the light guide member 5 and the substrate 2 are relatively rotated when the substrate 2 is fixed and a shearing stress parallel to the main surface of the substrate 2 is applied to a side surface of the light guide member 5. However, the intensity distribution on the object plane (light emitting surface) and the illuminance distribution on the image plane (light receiving surface) are point-symmetrical relative to the rotation axis, as illustrated in FIG. 12. Accordingly, even if the light guide member 5 deforms and is displaced relative to the substrate 2 (i.e., light emitting surface), the displacement vector of the illuminance distribution at the light receiving surface produced by the light emitting surface matches the displacement vector of the light receiving portion. Thus, the illuminance distribution of light received by the light receiving surface is not affected, and fluctuations of the gas detection sensitivity are further suppressed. As used herein, the term "object plane (light emitting surface)" refers to a surface which is in contact with the gas at a light emitting portion of the light emitting element 3 and is made of an optically transparent material. The term "image plane (light receiving surface)" refers to a surface which is in contact with the gas at a light sensitive portion of the light receiving element 4 and is made of an optically transparent material.

Figure 4:
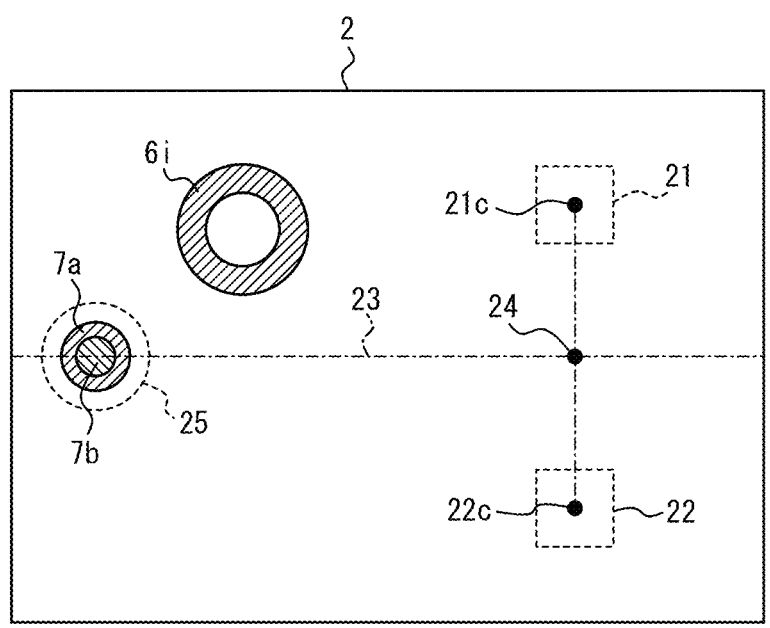
FIG. 4 is a diagram illustrating another example of the disposition of the first joint member.

FIG. 4 is a diagram illustrating another example of the disposition of the first joint member 6. The elements in FIG. 4 are the same as the corresponding elements denoted by the same reference symbols in FIG. 3, and a description thereof will thus be omitted. As illustrated in FIG. 4, the first joint member 6 may be provided at a different position on the main surface 20 of the substrate 2. More specifically, the first joint member 6 may be disposed so that the orthogonal projection image 6i thereof to the main surface 20 of the substrate 2 is not on the perpendicular bisector 23. In the y-axis direction, the first joint member 6 may be disposed so as to be closer to the second mirror 521 and the fourth mirror 522 than the first mirror 511 and the fifth mirror 513. The light emitting element 3 and the light receiving element 4 still need to receive or emit light directly from or to the first reflecting portion 51 for maintaining the optical path. For that purpose, the first joint member 6 is preferably provided at the location where the amount of a displacement of the first reflecting portion 51 becomes smaller than the amount of a displacement of the second reflecting portion 52 when the light guide member 5 is displaced relative to the substrate 2. In other words, the first joint member 6 serving as the rotation axis is preferably provided so as to be closer to the first reflecting portion 51 than the second reflecting portion 52. Specifically, the orthogonal projection image 6i of the first joint member 6 is preferably close to the midpoint 24.

Here, also in the case of FIG. 4, the second joint member 7 limits displacements of the light guide member 5 in directions other than the direction parallel to the main surface 20 of the substrate 2 when an external force is applied to the light guide member 5 or when a thermal expansion causes a distortion. In other words, the second joint member 7 limits displacements in the direction orthogonal to the main surface 20 of the substrate 2.

In an example, the second joint member limits displacements in the direction orthogonal to the main surface 20 of the substrate 2 and displacements in the direction connecting the centers of the respective orthogonal projection images of the first joint member and the second joint member to the main surface 20 of the substrate 2, when an external force is applied, from a point on the surface of the light guide member 5 which is farthest from the first joint member as a start point, in the direction parallel to the main surface 20 of the substrate 2 and orthogonal to the straight line connecting the start point and the first joint member.

In another example, the second joint member limits displacements other than displacements in the direction orthogonal to the main surface 20 of the substrate 2 and displacements in the direction connecting the centers of the respective orthogonal projection images of the first joint member and the second joint member to the main surface 20 of the substrate 2 when a thermal expansion causes a distortion.

Figure 5:
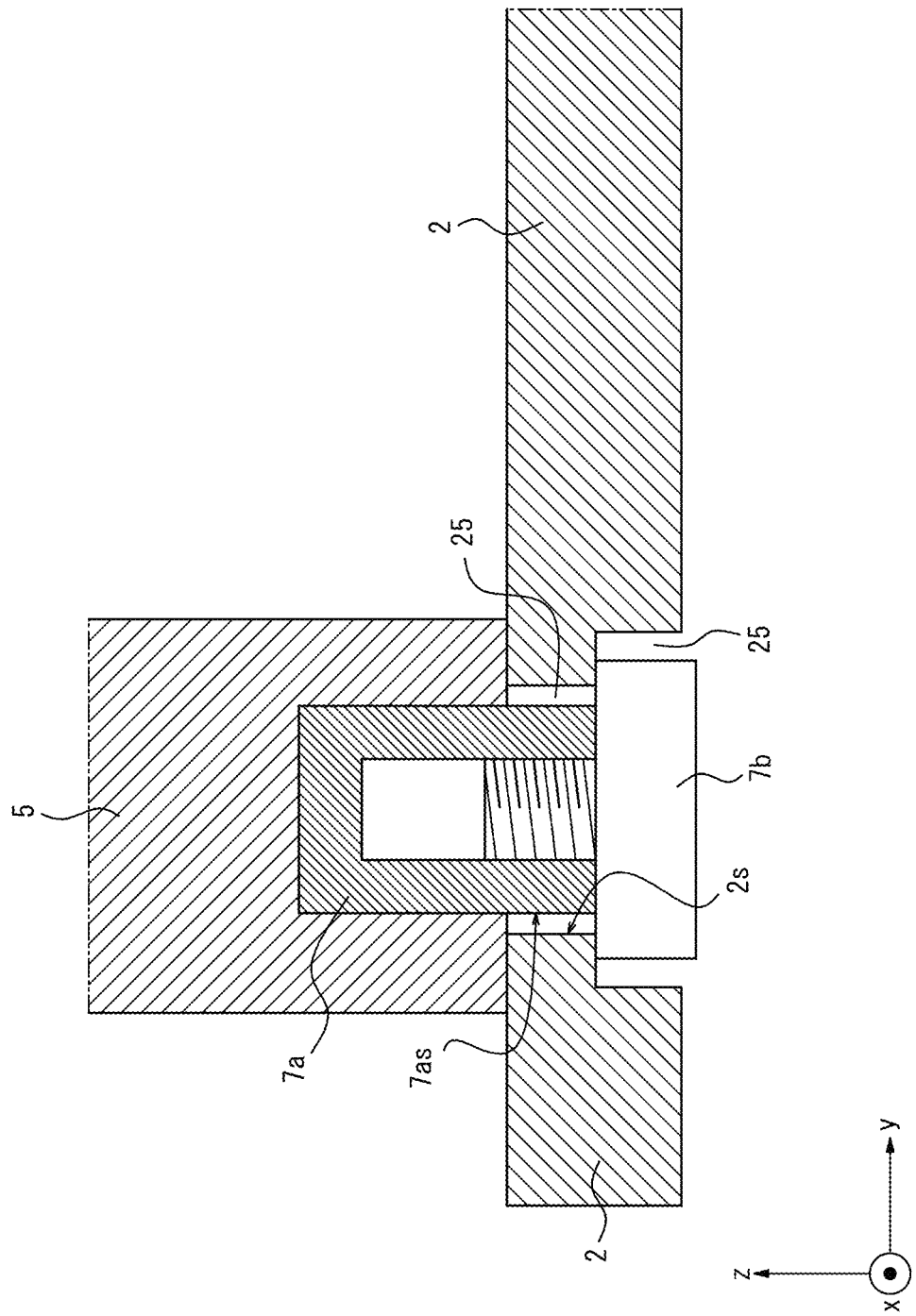
FIG. 5 is an enlarged cross-sectional view of the second joint member.

FIG. 5 is an enlarged cross-sectional view of the second joint member 7. In the present embodiment, the second joint member 7 including the inserted portion 7a and the fastening member 7b is spaced apart from the hole 25 in the direction parallel to the xy-plane. As illustrated in FIG. 5, the side surface 7as of the portion of the inserted portion 7a inserted into the hole 25 does not contact at least partially the side surface 2s of the hole 25 in the substrate 2. In the example of FIG. 5, even when the second joint member 7 is displaced to the maximum in the y-axis positive direction and the side surface 7as of the inserted portion 7a is brought into contact with the side surface 2s of the hole 25, space is maintained on the y-axis negative direction side. In contrast, the first bottom portion 61 of the first joint member 6, i.e., the portion joined to the substrate 2, is not spaced apart from the substrate 2. The second joint member 7 having the space in the xy-plane direction has a smaller joint degree than the joint degree of the first joint member 6. As used herein, the term "joint degree" indicates how much a joined object is resistant to displacements. In the present embodiment, the expression "having a large joint degree" means that the light guide member 5 is strongly joined to the substrate 2, or the light guide member 5 is tightly joined to the substrate 2 without space, so that the light guide member 5 is less likely to be displaced relative to the substrate 2. The expression "having a small joint degree" means that the light guide member 5 is weakly joined to the substrate 2, or the light guide member 5 is joined to the substrate 2 with space, or the side surface 7as and the side surface 2s partially contact with each other but the friction between them is small, so that the light guide member 5 is readily displaced relative to the substrate 2.

As described above, the light guide member 5 may be rotationally displaced relative to the substrate 2 about the first joint member 6 as the rotation axis. Although the second joint member 7 limits free rotational displacements about the z-axis as the rotation axis, the space between the second joint member 7 and the hole 25 allows minute rotational displacements. Here, allowable minute rotational displacements can be regulated by the size of the space. As described above, as long as the first reflecting portion 51 can directly reflect light emitted from the light emitting element 3 and light to be received by the light receiving element 4, the optical path is maintained before and after a rotational displacement. Therefore, the space between the second joint member 7 and the hole 25 is set so that the light path to the light guide member 5 is maintained even when the light guide member 5 is displaced relative to the substrate 2 to the maximum. In the case where the installation tolerances of the second joint member 7 and the first joint member 6 are the same, the second joint member 7 and the first joint member 6 are preferably distant from each other in view of the yield in mass productions to reduce angular displacements of the optical members. Particularly, the distance between the centers of the respective orthogonal projection images of the first joint member and the second joint member to the main surface 20 of the substrate 2 is preferably longer than a half the maximum distance in the substrate 2. Here, the difference in thermal expansion coefficients of different resin materials is about 100 ppm and the maximum temperature difference in the use environment of a typical electronic device is about 150° C. From the product of these values, the amount of a distortion caused by a thermal expansion is thus estimated to be 1.5% of the maximum length of the light-guiding member 5. Accordingly, the space may be designed to be 1.5% or more of the maximum length of the light guide member 5.

Further, as illustrated in FIG. 5, the hole 25 in the substrate 2 is provided with a step, and the head of the screw as the fastening member 7b contacts the step. The fastening member 7b fastens the inserted portion 7a by being screwed in the inserted portion 7a which is connected to the light guide member 5. The substrate 2 and the light guide member 5 are thus securely joined in the z-axis direction. As a result, displacements of the light guide member 5 in the z-axis direction relative to the substrate 2 are further limited, and the degree of freedom of translations in the z-axis direction is eliminated. With regard to the degree of freedom of rotations relative to the axis connecting the two restriction points, the degree of freedom of rotations is eliminated and rotations are limited because the first joint member 6 and the substrate are in surface contact. In other words, the light guide member 5 has no degree of freedom of rotations about the axis connecting between the point of contact of the first joint member 6 the substrate 2 and the point of contact of the second joint member 7 and the substrate 2.

The first joint member 6 restricts the degrees of freedom of translations of the light guide member 5 relative to the substrate 2 in the x-axis, y-axis, and z-axis directions. On the other hand, as described above, the second joint member 7 limits displacements of the light guide member 5 in the direction orthogonal to the main surface 20 of the substrate 2. Preferably, the second joint member 7 is spaced apart from the hole 25 so that the degree of freedom is not restricted in the direction where the space is provided. As illustrated in FIG. 13, an object is typically over constrained when the object is constrained at two or more restriction points with the same degrees of freedom. When the object deforms due to a thermal expansion or the like, a distortion may be generated along the line segment connecting the restriction points. When the over constraint is present, free expansions of the distortion is hindered by the restriction points. As a result, the distortion deviates to a direction other from the direction connecting the restriction points, resulting in a deformation other than an overall similarity reduction (magnification).

As illustrated in FIG. 11, when the hole 25 is an elongated hole, the over constraint is prevented. The second joint member 7 can thus be displaced freely in the extension direction of the elongated hole, and distortions caused by a thermal expansion are reduced. Particularly, an elongation in the direction connecting the respective centers of the orthogonal projection images of the first joint member and the second joint member to the main surface 20 of the substrate 2 enables the gas detection apparatus 1 to suppress degradation of the optical performances caused by the expansion. Although distortions may take place between the restriction points, free displacements can cancel out all of the distortions and no deformation takes place other than a similarity reduction (magnification) caused by the temperature change when there is no restriction in the direction connecting the restriction points.

As described above, the above configuration of the gas detection apparatus 1 according to the present embodiment prevents the light guide member 5 from being affected by a deformation of the substrate 2 caused by a thermal expansion. In addition, as described above, even when the light guide member 5 is displaced relative to the substrate 2 to the maximum, the light path is properly maintained by the second joint member 7. Accordingly, the gas detection apparatus 1 is capable of suppressing degradation of the sensitivity caused by deformations other than a similarity reduction (magnification)

Further, in the gas detection apparatus 1 configured so that the orthogonal projection image 6i to the main surface 20 of the substrate 2 is on the perpendicular bisector of the line connecting the center of the first region 21 and the center of the second region 22, the illuminance distribution on the image plane (light receiving surface) is not affected and fluctuation of the gas detection sensitivity is suppressed. As illustrated in FIG. 12, the intensity distribution on the object plane (light emitting surface) and the illuminance distribution on the image plane (light receiving surface) are point-symmetrical relative to the rotation axis. When the substrate 2 deforms by a thermal expansion, the deformation takes place symmetrically to the perpendicular bisector. This is because the displacement of the illuminance distribution in the light receiving surface produced by the light emitting surface substantially matches the displacement of the light receiving surface in terms of the direction and the amount.

In addition, even if the substrate 2 deforms by a thermal expansion, the illuminance distribution on the image plane (light receiving surface) is less likely to be affected and fluctuations of the gas detection sensitivity are suppressed as long as the respective orthogonal projection images of the first joint member 6 and the second joint member 7 to the main surface of the substrate are in the region Rt as illustrated in FIG. 15, for the same reason. Here, the straight line Lp is the perpendicular bisector 23 of the line segment connecting the center of the first region 21 and the center of the second region 22. The straight Le is the straight line parallel to the straight line Lp and passing through the first region 21. The straight line Ld is a straight line parallel to the straight line Lp and passing through the second region 22. The region Rt is the largest region in the main surface of the substrate sandwiched between the straight line Le and the straight line Ld.

Second Embodiment

Figure 6:
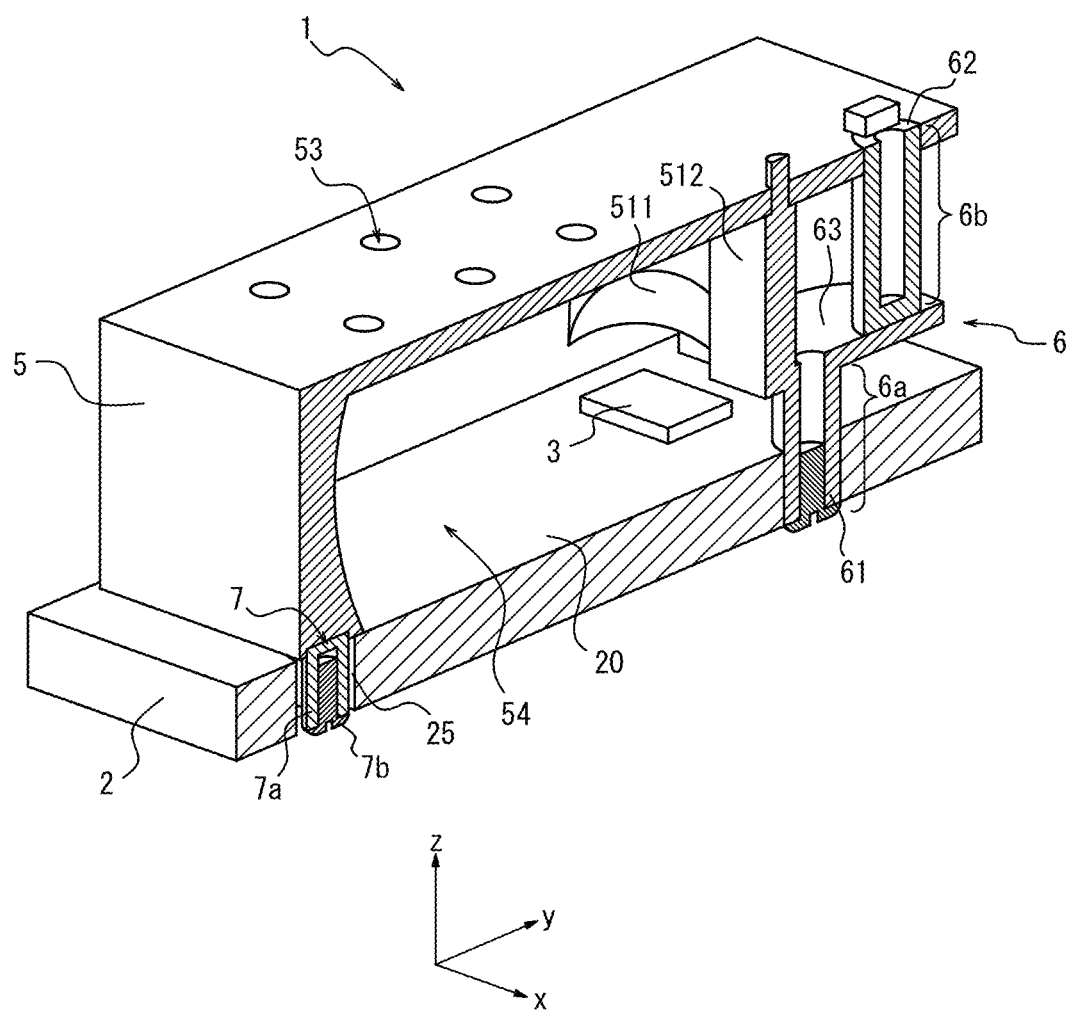
FIG. 6 is a diagram illustrating another example of a cross-section of a gas detection apparatus.

FIG. 6 is a drawing illustrating an example of a cross-section of a gas detection apparatus according to another embodiment of the present disclosure. The gas detection apparatus 1 according to the present embodiment has a different configuration of the first joint member 6 from than that of the gas detection apparatus 1 according to the first embodiment described above. Other components are the same as the corresponding components in the gas detection apparatus 1 according to the first embodiment. For example, a perspective view of the gas detection apparatus 1 according to the present embodiment is illustrated in FIG. 1 as in the first embodiment. In addition, the components that are the same as those in the gas detection apparatus 1 according to the first embodiment are denoted by the same reference symbols used in FIGS. 1 to 4, and a detailed description thereof will be omitted.

As illustrated in FIG. 6, the first joint member 6 in the present embodiment is not a columnar body. The first joint member 6 includes a first portion 6a including a first bottom portion 61, a second portion 6b including a second bottom portion 62, and a coupling portion 63 which couples the first portion 6a, the second portion 6b, and the third mirror 512. The third mirror 512 is coupled to the first joint member 6. As a result, the relative position of the first reflecting portion 51 to the second reflecting portion 52 is fixed further securely.

FIG. 7 is in the present embodiment is a diagram illustrating an example of the disposition and the shape of the first joint member 6. In FIG. 7, the main surface 20 of the substrate 2 viewed toward the z-axis negative direction is illustrated. In the present embodiment, the orthogonal projection image 6i to the main surface 20 of the substrate 2 is arcuate. The first joint member 6 is disposed so that the orthogonal projection image 6i thereof to the main surface 20 of the substrate 2 encompasses the midpoint 24 of the line segment connecting the center 21c of the first region 21 and the center 22c of the second region 22. As described above, disposing the orthogonal projection image 6i of the first joint member 6 so as to be close to the midpoint 24 contributes to reduce the amount of a displacement of the first reflecting portion 51 so as to be smaller than the amount of a displacement of the second reflecting portion 52, thereby maintaining deviations of the optical path parameters to be small.

As described above, the above configuration of the gas detection apparatus 1 according to the present embodiment provides the same effects as those of the first embodiment. In addition, because the gas detection apparatus 1 according to the present embodiment also includes the first joint member 6 having the coupling portion 63 for additionally coupling the third mirror 512, the relative position of the first reflecting portion 51 to the second reflecting portion 52 can be fixed further securely.

Modifications

Although the embodiments have been described with reference to the drawings and the examples, it should be noted that various modifications and variations can be readily conceived of by a person skilled in the art based on the present disclosure. It should be understood that such modifications and variations are encompassed within the scope of the present disclosure. For example, the members, the functions included in each means, or the like can be rearranged unless they are logically contradicted, and a plurality of means, and the like can be combined into one or means can be divided, for example.

For example, the orthogonal projection image 6i of the first joint member 6 may be polygonal. In one modification, as illustrated in FIG. 8, the orthogonal projection image 6i is quadrangular and the first joint member 6 may be a quadrangular prism.

Figure 9:
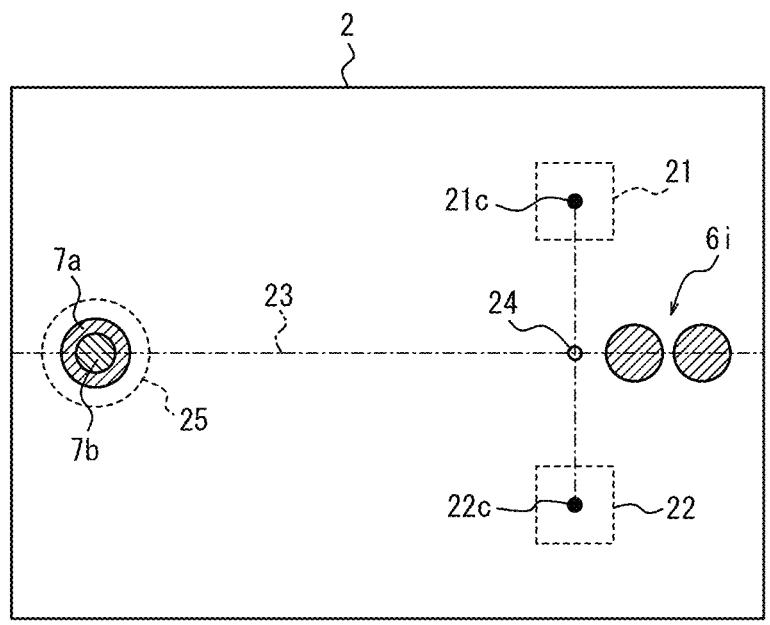
FIG. 9 is a diagram illustrating another example of the shape of the first joint member.

For example, the above embodiments have been described that the first joint member 6 is composed of a single part. The first joint member 6 may be composed of a plurality of parts. Here, the plurality of parts are separated from each other but are disposed to be close to each other to some extent so that they collectively serve as the rotation axis when an external force is applied to the light guide member 5 in the direction parallel to the main surface 20 of the substrate 2. In one modification, the orthogonal projection image 6i may have a plurality of solid circles, as illustrated in FIG. 9. In this configuration, the first joint member 6 can join the substrate 2 and the light guide member 5 more securely.

Figure 10:
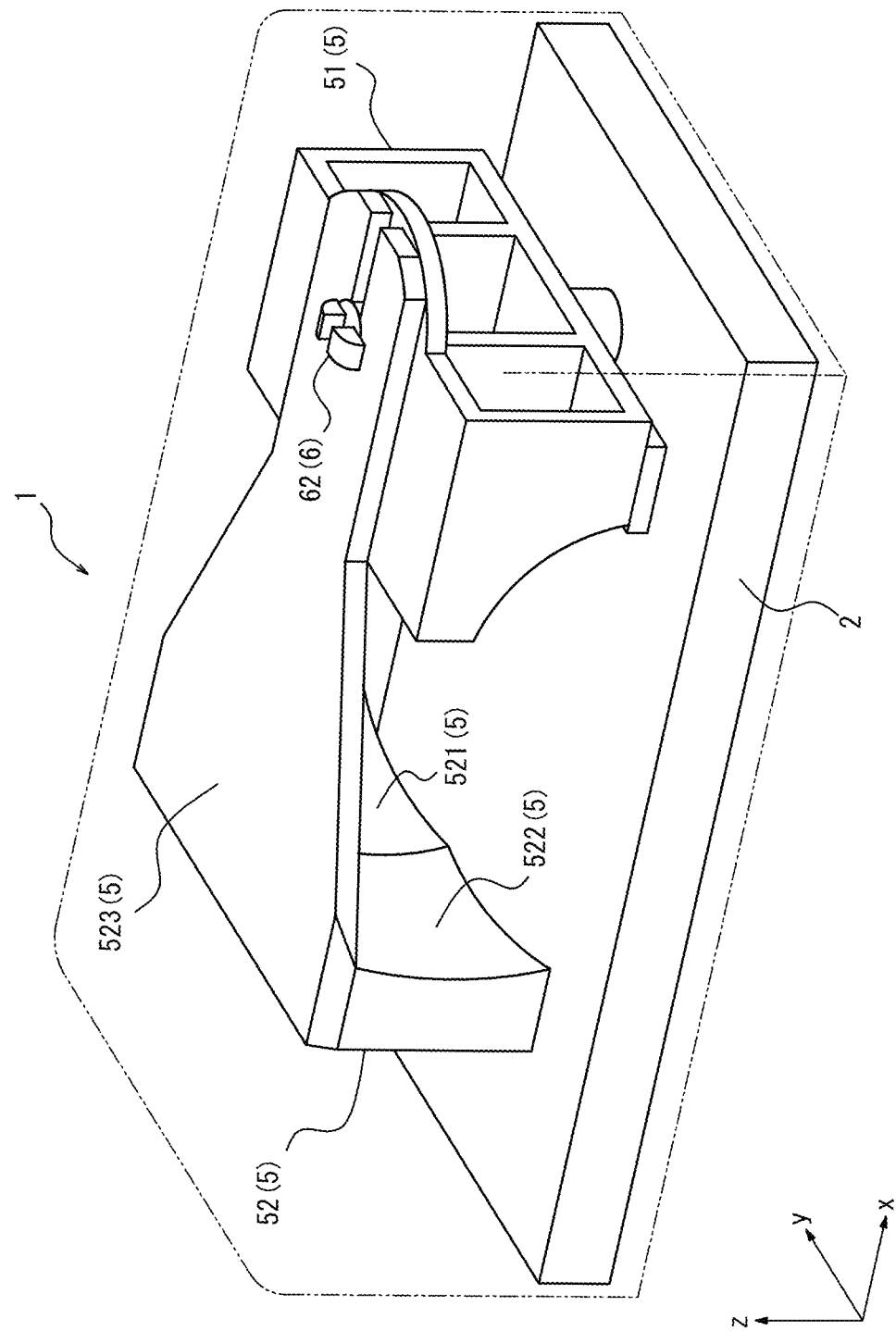
FIG. 10 is a diagram illustrating another example configuration of the light guide member.

For example, the above embodiments have been described that the relative position of the first reflecting portion 51 to the second reflecting portion 52 is fixed by monolithic molding, an adhesive, or the like. In one modification, as illustrated in FIG. 10, the second reflecting portion 52 may be securely joined to the second bottom portion 62 of the first joint member 6 together with the first reflecting portion 51 by an adhesive, screws, nails, mating, grommets, welding, or the like. In this configuration, the second reflecting portion 52 may include an extension portion 523 which is molded monolithically with the second mirror 521 and the fourth mirror 522, and extends to the first reflecting portion 51.

For example, although the first joint member 6 is shaped to have the long sides in the z-axis direction in the above embodiments, the first joint member 6 may be shaped to have the long sides in a direction other than the direction of the z-axis. For example, as illustrated in FIG. 14, the first joint member 6 may be a columnar body having the long sides in the x-axis direction. The first joint member 6 may be connected to the one side of the main surface 20 of the substrate 2 parallel to the x-axis, and to the bottom portion of the first reflecting portion 51 facing the one side by an adhesive or the like. In this configuration, the light guide member 5 might be displaced in the z-axis positive direction relative to the substrate 2 about the first joint member 6 as the rotation axis. By strongly joining the substrate 2 and the light guide member 5 by the fastening member 7b in the z-axis direction, however, displacements of the light guide member 5 can be limited.

For example, in the above embodiments, the first reflecting portion 51 is joined to the substrate 2 by the first joint member 6 having a large joint degree, and the second reflecting portion 52 is joined to the substrate 2 by the second joint member 7 having a small joint degree. Note that the combinations of the first joint member 6, the second joint member 7, the first reflecting portion 51, and the second reflecting portion 52 are not limited to the examples of the combinations in the above-described embodiments. For example, the first reflecting portion 51 may be joined to the substrate 2 by the second joint member 7, and the second reflecting portion 52 may be joined to the substrate 2 by the first joint member 6. Alternatively, for example, the first joint member 6 and the second joint member 7 may join a certain reflecting portion of the first reflecting portion 51 or the second reflecting portion 52 to the substrate 2.

When the above-described embodiments are taken from a different perspective, a gas detection apparatus of the present embodiment includes a substrate; a light emitting element 3 provided on the main surface 20 of the substrate for emitting light; a light receiving element provided on the main surface 20 of the substrate for receiving the light; a light guide member for guiding the light emitted by the light emitting element 3 to the light receiving element 4; a first joint member; and a second joint member, wherein the first joint member restricts the substrate and the light guide member in a first translation direction parallel to a plane of the substrate in a first restriction degree, in a second translation direction parallel to the plane of the substrate and orthogonal to the first translation direction in a second restriction degree, and in a third translation direction orthogonal to the plane of the substrate in a third restriction degree, the second joint member restricts the substrate and the light guide member in the first translation direction in a fourth restriction degree, in the second translation direction in a fifth restriction degree, and in the third translation direction in a sixth restriction degree, and at least one of the first to sixth restriction degrees is zero, at least one of the first restriction degree and the fourth restriction degree is non-zero, at least one of the second restriction degree and the fifth restriction degree is non-zero, and at least one of the third restriction degree and the sixth restriction degree is non-zero.

As used herein, the term "restriction degree" is an indicator indicating how freely an object can be translated relative to a certain direction, and zero restriction degree indicates that the object can be displaced freely in that direction. The method of specifically measuring the restriction degree includes displacing one point on the object in a predetermined amount X, and measuring the average displacement amount Y of the object as a whole upon the displacement. In this case, the restriction degree is given by the absolute value of (X−Y)/X. Note that restriction degrees of 0.01 or less are regarded as zero.

When at least one of the first to sixth restriction degrees is zero, at least one of the first joint member and the second joint member is allowed to move freely in one of the first to third directions.

Further, when at least one of the first restriction degree and the fourth restriction degree is non-zero, at least one of the second restriction degree and the fifth restriction degree is non-zero, and at least one of the third restriction degree and the sixth restriction degree is non-zero, the entire light guide member is prevented from being separated from the substrate.

Stated differently, the light guide member and the substrate are fixed as a whole. In addition, the light guide member and the substrate are allowed to be displaced freely in one of the first to the third direction when an external force is applied to the light guide member or when a thermal expansion causes a distortion. As a result, distortions of the optical path can be suppressed while the reliability of the apparatus is maintained.

The method of setting a restriction degree to zero is not particularly limited. Example methods include unfastening the fastening member in the configuration where the inserted portion of the joint member is inserted into the hole (thereby the third and sixth restriction degrees can be set to zero), and forming the inserted portion so as not to contact the side surface of the hole (thereby the first, second, fourth, and fifth restriction degrees can be set to zero), as described in the embodiment described above.

For suppressing occurrence of a distortion of the optical path in response to an external force and a stress in the plane direction of the substrate, the fourth restriction degree and/or the fifth restriction degree may be set to zero (in this case, the second joint member side is allowed to be freely displaced in at least one of plane directions parallel to the substrate). Alternatively, the first restriction degree and/or the second restriction degree may be set to zero (in this case, the first joint member side is allowed to be freely displaced in at least one of plane directions parallel to the substrate).

For suppressing occurrence of a distortion of the optical path in response to an external force and a stress in the direction orthogonal to the substrate, the sixth restriction degree may be set to zero (in this case, the second joint member side is allowed to be freely displaced in the direction orthogonal to the substrate). Alternatively, the third restriction degree may be set to zero (in this case, the first joint member side is allowed to be freely displaced in the direction orthogonal to the substrate).

From the viewpoint of the reliability and ease of assembly, it may be preferable that the first to third restriction degrees are non-zero.

The invention claimed is:

1. A gas detection apparatus comprising:
a substrate;
a light emitting element provided on a main surface of the substrate for emitting light;
a light receiving element provided on the main surface of the substrate for receiving the light;
a light guide member for guiding the light emitted by the light emitting element to the light receiving element;
a first joint member; and
a second joint member,
the first joint member joining the substrate and the light guide member, and limiting a displacement to a direction parallel and/or orthogonal to the main surface of the substrate when an external force is applied to the light guide member,
the second joint member joining the substrate and the light guide member, and limiting a displacement of the light guide member to a direction parallel to the main surface of the substrate and/or limiting the displacement within a plane orthogonal to the main surface of the substrate, when an external force is applied to the light guide member or when a thermal expansion causes a distortion, and
at least one of the first joint member and the second joint member being allowed to be displaced in the direction parallel to the main surface of the substrate or within the plane orthogonal to the main surface of the substrate,
wherein the first joint member serves as a rotational axis when the substrate is fixed and an external force is applied, from a point on a surface of the light guide member which is farthest from the first joint member as a start point, in a direction parallel to the main surface of the substrate and orthogonal to a straight line connecting the start point and the first joint member.

2. The gas detection apparatus according to claim 1, wherein
the substrate is provided with a hole, and the second joint member comprises an inserted portion which is connected to the light guide member while at least a part of the inserted portion is inserted into the hole.

3. The gas detection apparatus according to claim 2, wherein
the hole penetrates the substrate, and
the second joint member comprise a fastening member which is inserted into the hole from a bottom surface which is a surface opposite to the main surface of the substrate to fasten the inserted portion.

4. The gas detection apparatus according to claim 3, wherein the fastening member fastens the inserted portion by being screwed in the inserted portion.

5. The gas detection apparatus according to claim 2, wherein a side surface of the at least the part of the inserted portion inserted into the hole does not contact a side surface of the hole.

6. The gas detection apparatus according to claim 5, wherein a part of the first joint member joined to the substrate is not spaced apart from the substrate.

7. The gas detection apparatus according to claim 2, wherein the hole is an elongated hole.

8. The gas detection apparatus according to claim 7, wherein the elongated hole is a hole extending in a direction connecting centers of respective orthogonal projection images of the first joint member and the second joint member to the main surface of the substrate.

9. The gas detection apparatus according to claim 1, wherein the second joint member limits a displacement in a direction other than a direction connecting centers of respective orthogonal projection images of the first joint member and the second joint member to the main surface of the substrate when a thermal expansion causes a distortion.

10. The gas detection apparatus according to claim 1, wherein the light guide member comprises a first reflecting portion and a second reflecting portion.

11. The gas detection apparatus according to claim 10, a relative position of the first reflecting portion to the second reflecting portion is fixed.

12. The gas detection apparatus according to claim 10, wherein
the first reflecting portion is joined to the substrate by the first joint member, and
the second reflecting portion is joined to the substrate by the second joint member.

13. The gas detection apparatus according to claim 1, wherein the first joint member is composed of a plurality of parts.

14. The gas detection apparatus according to claim 1, wherein the first joint member is composed of a single part.

15. The gas detection apparatus according to claim 14, wherein an orthogonal projection image of the first joint member to the main surface of the substrate is one of solid circular, hollow circular, arcuate, and polygonal.

16. The gas detection apparatus according to claim 1, wherein an orthogonal projection image of the first joint member to the main surface of the substrate is present in a region Rt, the region Rt being a largest region in the main surface of the substrate sandwiched between a straight line Le and a straight line Ld, where a straight line Lp is a perpendicular bisector of a line segment connecting a center of the light receiving element and a center of the light emitting element, the straight line Ld is a straight line parallel to the straight line Lp and passing through the light receiving element, and the straight line Le is a straight line parallel to the straight line Lp and passing through the light emitting element.

17. The gas detection apparatus according to claim 16, wherein the first joint member is disposed so that the orthogonal projection image of the first joint member to the main surface of the substrate is on the straight line Lp.

18. The gas detection apparatus according to claim 1, wherein a distance between centers of respective orthogonal projection images of the first joint member and the second joint member to the main surface of the substrate is longer than a half a maximum distance in the substrate.

19. The gas detection apparatus according to claim 1, wherein a joint degree of the second joint member is smaller than a joint degree of the first joint member.

20. A gas detection apparatus comprising:
a substrate;
a light emitting element provided on a main surface of the substrate for emitting light;
a light receiving element provided on the main surface of the substrate for receiving the light;
a light guide member for guiding the light emitted by the light emitting element to the light receiving element;
a first joint member; and
a second joint member,
the first joint member joining the substrate and the light guide member, and limiting a displacement to a direction parallel and/or orthogonal to the main surface of the substrate when an external force is applied to the light guide member,
the second joint member joining the substrate and the light guide member, and limiting a displacement of the light guide member to a direction parallel to the main surface of the substrate and/or limiting the displacement within a plane orthogonal to the main surface of the substrate, when an external force is applied to the light guide member or when a thermal expansion causes a distortion, and
at least one of the first joint member and the second joint member being allowed to be displaced in the direction parallel to the main surface of the substrate or within the plane orthogonal to the main surface of the substrate,
wherein an orthogonal projection image of the first joint member to the main surface of the substrate is present in a region Rt, the region Rt being a largest region in the main surface of the substrate sandwiched between a straight line Le and a straight line Ld, where a straight line Lp is a perpendicular bisector of a line segment connecting a center of the light receiving element and a center of the light emitting element, the straight line Ld is a straight line parallel to the straight line Lp and passing through the light receiving element, and the straight line Le is a straight line parallel to the straight line Lp and passing through the light emitting element.

* * * * *